UNITED STATES PATENT OFFICE.

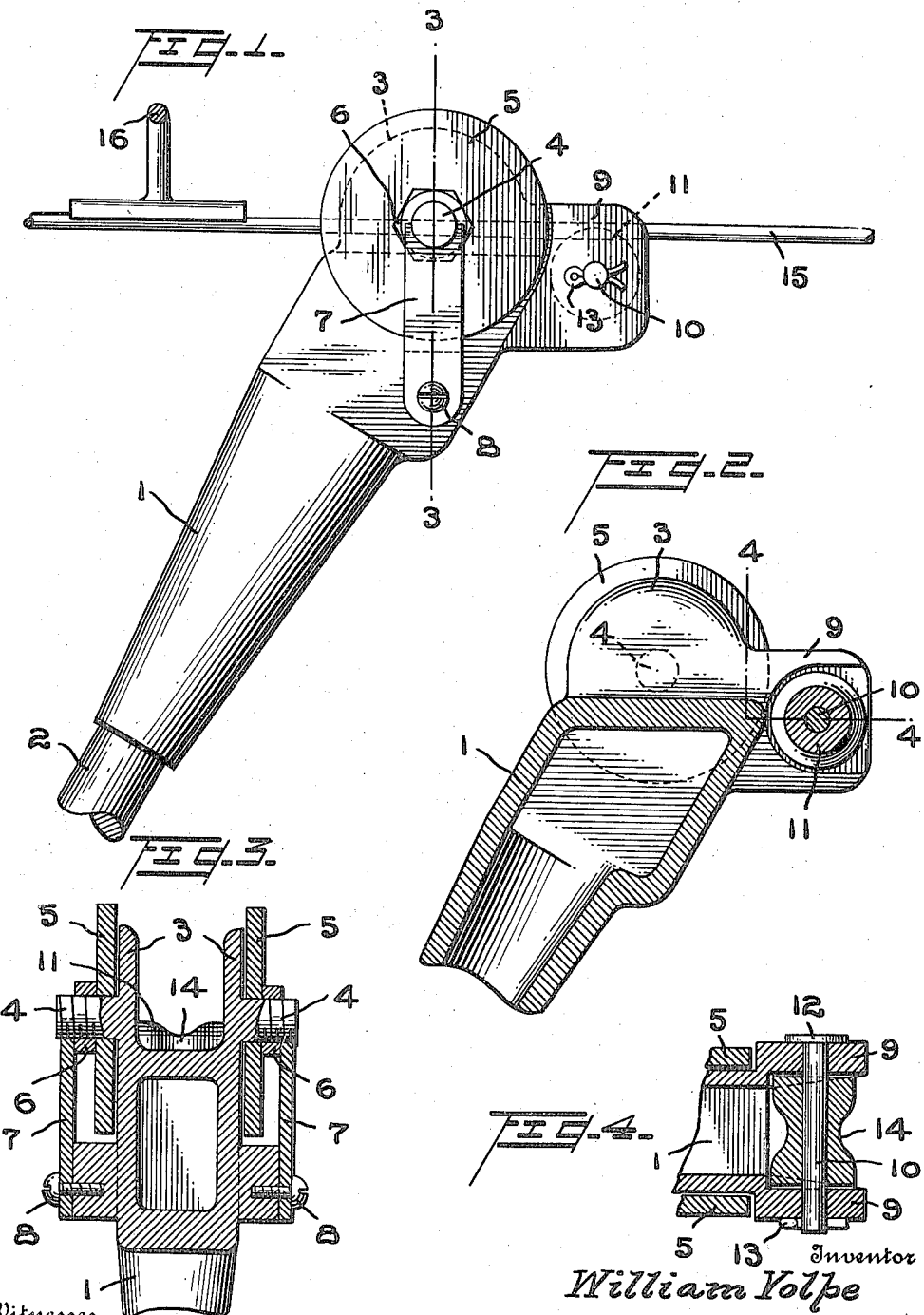

WILLIAM VOLPE, OF PHILADELPHIA, PENNSYLVANIA.

TROLLEY-HEAD.

1,146,040.

Specification of Letters Patent. Patented July 13, 1915.

Application filed August 17, 1914. Serial No. 857,041.

*To all whom it may concern:*

Be it known that I, WILLIAM VOLPE, a subject of the King of Italy, residing at Philadelphia, in the county of Philadelphia and State of Pennsylvania, have invented certain new and useful Improvements in Trolley-Heads, of which the following is a specification.

My invention relates to improvements in trolleys and has for an object to provide a trolley head, which may be readily attached to an ordinary trolley pole and when so attached will overcome any liability of the trolley leaving the feed wire, over which it travels.

Another object is to provide a device of this character, consisting of single integral casting, provided with two guard wheels and a wheel adapted to contact with the feed wire, which wheel is independent of the guard wheels.

A further object is to provide a trolley head, which is neat and attractive in appearance, strong and durable in use, and which can be manufactured at a comparatively low cost.

With these and other objects in view, my invention consists of certain novel features of construction and combinations of parts, which will hereinafter be more fully described and pointed out in the claim.

In the accompanying drawings, forming a part of this specification, and in which like parts are referred to by like reference characters: Figure 1 is a side elevation illustrating my improvements. Fig. 2 is a fragmentary view in longitudinal section. Fig. 3 is a transverse section on the line 3—3 of Fig. 1. Fig. 4 is a fragmentary section taken on the line 4—4 of Fig. 2.

My improved trolley head consists of a casting 1, which is adapted to be positioned on an ordinary trolley pole 2. The upper end of the casting is bifurcated, providing two upwardly projecting integral ears 3—3, each ear being provided with a stub axle 4, adapted to receive guard wheels 5—5. To securely hold the wheels 5—5 on the axles 4, I employ jam nuts 6, which are screwed on the threaded portions of the axles 4. The nuts 6 are held against accidental movement by means of locking bars 7, secured to the casting 1, by means of screws 8. This bar 8 performs a double function, in that it prevents the nuts 6 from accidentally coming off, also supporting the free ends of the stub axles 4, as is clearly shown in Fig. 3, of the accompanying drawing. I provide two integral rearwardly projecting ears 9—9, which provides bearings for a shaft 10, upon which is mounted the current contacting roller 11. The shaft 10, has a head 12 at one end and is held in place by means of a cotter pin 13. While I have shown as a preferred form, the contacting wheel 11, with a groove 14, I would have it understood that I do not limit myself to this particular.

In operation, as the trolley head travels over the feed wire 15, the wire 15 will assume a position between the upwardly projecting ears 3—3, which ears act as a guard, thus preventing the trolley pole from accidentally disengaging the feed wire 15.

In devices of this character, now in use an undesirable feature is, that the trolley pole at times comes in contact with the cross wires 16, causing the trolley pole to disengage the feed wire. With a view to overcoming this undesirable construction, I provide the wheels 5—5, which are adapted to engage the cross wires 16, eliminating the possibility of the trolley pole coming off the feed wire, as is clearly shown in the accompanying drawings. By providing these movable wheels 5—5, it prevents any tendency of the pole to drag, which would cause the pole to disengage the feed wire.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A trolley head, comprising a casting having a pair of upwardly and a pair of rearwardly projecting integral ears thereon, outwardly projecting axles on the upwardly projecting ears, having screw-threaded outer ends, guard wheels on the axles, nuts on the axles holding the guard wheels thereon, bars secured at their lower ends to the casting and at their upper ends positioned under the axles and against the nuts, and a contact roller located between the rearwardly projecting ears, substantially as described.

In testimony whereof I have signed my name to this application in the presence of two subscribing witnesses.

WILLIAM VOLPE.

Witnesses:
M. E. DITTUS,
C. E. POTTS.

Copies of this patent may be obtained for five cents each, by addressing the "Commissioner of Patents, Washington, D. C."